United States Patent
Feng et al.

(10) Patent No.: US 9,837,946 B2
(45) Date of Patent: Dec. 5, 2017

(54) METHOD AND DEVICE FOR ACQUIRING ROTOR POSITION BASED ON PERMANENT MAGNET SYNCHRONOUS DRIVE SYSTEM

(71) Applicant: CRRC ZHUZHOU ELECTRIC LOCOMOTIVE RESEARCH INSTITUTE CO., LTD., Zhuzhou, Hunan (CN)

(72) Inventors: Jianghua Feng, Hunan (CN); Kean Liu, Hunan (CN); Jing Shang, Hunan (CN); Junfeng Xu, Hunan (CN); Lei Xiao, Hunan (CN); Chaoyang Zhang, Hunan (CN); Yuliang Wen, Hunan (CN); Yaping He, Hunan (CN); Xiong Liu, Hunan (CN)

(73) Assignee: CRRC ZHUZHOU ELECTRIC LOCOMOTIVE RESEARCH INSTITUTE CO., LTD., Zhuzhou, Hunan (CN)

( * ) Notice: Subject to any disclaimer, the term of this patent is extended or adjusted under 35 U.S.C. 154(b) by 0 days.

(21) Appl. No.: 15/100,802

(22) PCT Filed: Mar. 3, 2015

(86) PCT No.: PCT/CN2015/073536
§ 371 (c)(1),
(2) Date: Jun. 1, 2016

(87) PCT Pub. No.: WO2015/131791
PCT Pub. Date: Sep. 11, 2015

(65) Prior Publication Data
US 2016/0365816 A1    Dec. 15, 2016

(30) Foreign Application Priority Data

Mar. 5, 2014   (CN) .......................... 2014 1 0078666

(51) Int. Cl.
*H02P 21/00*   (2016.01)
*H02P 21/22*   (2016.01)
(Continued)

(52) U.S. Cl.
CPC ................. *H02P 21/22* (2016.02); *H02P 6/18* (2013.01); *H02P 6/182* (2013.01); *H02P 27/08* (2013.01)

(58) Field of Classification Search
CPC .......... H02K 41/03; H02P 9/009; H02P 21/02
See application file for complete search history.

(56) References Cited

U.S. PATENT DOCUMENTS 8,564,228 B2 * 10/2013 Sengchanh ............ H02K 1/146
310/12.25

FOREIGN PATENT DOCUMENTS

CN   101505130 A   8/2009
CN   101771378 A   7/2010
(Continued)

OTHER PUBLICATIONS

International Search Report corresponding to Application No. PCT/CN2015/073536; dated Jun. 4, 2015, with English translation (Continued)

*Primary Examiner* — Karen Masih
(74) *Attorney, Agent, or Firm* — Cantor Colburn LLP

(57) ABSTRACT

A method and device for acquiring a rotor position based on a permanent magnet synchronous drive system. The permanent magnet synchronous drive system includes an inverter and a permanent magnet synchronous motor, wherein the initial speed of the permanent magnet synchronous motor is not zero. The method includes: controlling a bridge arm switch of an inverter periodically; collecting a three-phase current of the permanent magnet synchronous motor at a fixed time within each control period; and after the three- (Continued)

phase current is reversed, sending same to a phase-locked loop system to conduct processing, so as to obtain a phase angle of an induction potential vector, and according to the phase angle of the induction potential vector, acquiring a rotor position angle of the permanent magnet synchronous motor.

9 Claims, 5 Drawing Sheets

(51) Int. Cl.
    *H02P 6/18*     (2016.01)
    *H02P 6/182*     (2016.01)
    *H02P 27/08*     (2006.01)

(56) References Cited

FOREIGN PATENT DOCUMENTS

| | | |
|---|---|---|
| CN | 102710188 A | 10/2012 |
| CN | 103199788 A | 7/2013 |
| CN | 103795306 A | 5/2014 |
| JP | H1175394 A | 3/1999 |
| JP | 2010035352 A | 2/2010 |

OTHER PUBLICATIONS

Written Opinion of the International Searching Authority corresponding to Application No. PCT/CN2015/073536; dated Jun. 4, 2015.

\* cited by examiner

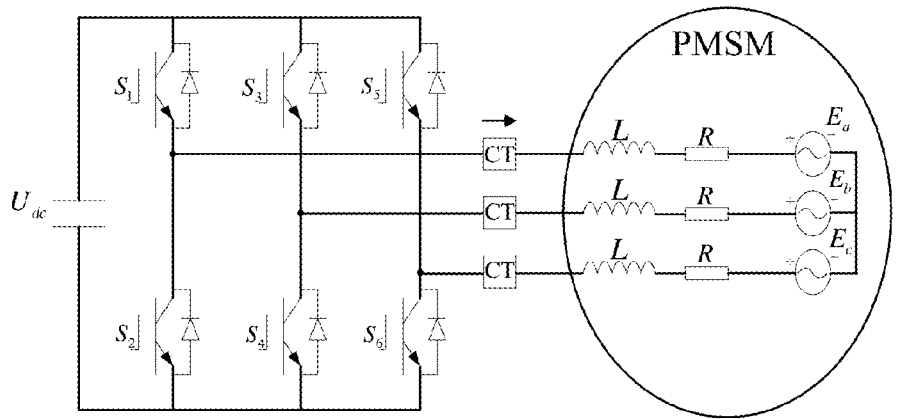

Fig. 1 control a bridge arm switch of the inverter periodically, so that during each control period, a current in each phase of stator winding of the permanent magnet synchronous motor is raised gradually from zero during a first time period, and is gradually attenuated to zero from an end value of the rising during a second time period, with a sum of the first time period and the second time period being equal to the whole control period — 201 collect a three-phase current of the permanent magnet synchronous motor at a fixed time instant during each control period — 202 reverse the three-phase current and send the reversed three-phase current to a phase-locked loop system for processing to obtain a phase angle of an induced potential vector, and acquire a rotor position angle of the permanent magnet synchronous motor based on the phase angle of the induced potential vector, with the rotor position angle being an angle between an a-phase winding and a permanent magnet flux linkage — 203

Fig. 2

METHOD AND DEVICE FOR ACQUIRING ROTOR POSITION BASED ON PERMANENT MAGNET SYNCHRONOUS DRIVE SYSTEM

The present application is the national phase of International Application No. PCT/CN2015/073536, titled "METHOD AND DEVICE FOR ACQUIRING ROTOR POSITION BASED ON PERMANENT MAGNET SYNCHRONOUS DRIVE SYSTEM", filed on Mar. 3, 2015, which the priority to Chinese Patent Application No. 201410078666.9, entitled "METHOD AND DEVICE FOR ACQUIRING ROTOR POSITION BASED ON PERMANENT MAGNET SYNCHRONOUS DRIVE SYSTEM" and filed with the Chinese State Intellectual Property Office on Mar. 5, 2014, both of which are incorporated herein by reference in entirety.

FIELD

The present disclosure relates to the field of motor technology, and particularly to a method and a device for acquiring a rotor position based on a permanent magnet synchronous drive system.

BACKGROUND

The permanent magnet synchronous drive system, as a new type of drive system, is used to control a rotation speed and a rotation torque of a permanent magnet synchronous motor in a frequency modulation and voltage modulation way, and has become an important integral component of an alternating-current drive system due to its advantages such as a simple structure, a great power density, great output torque at a low speed, a high efficiency and convenient maintenance. In an application of the permanent magnet synchronous drive system, an operating technology at a speed refers to a process in which the permanent magnet synchronous motor performs a powered operation again while the motor still has a certain initial speed after being powered off. For example, in the field of rail transit, the motor needs to perform traction again at a speed in a situation such as passing neutral section and short-time overcurrent and overvoltage. Further, for example, in the field of wind power generation, a motor having a certain initial speed needs to operate again before a converter starts to operate. In each of these operating conditions, the permanent magnet synchronous drive system needs to have the ability to operate at a speed.

The permanent magnet synchronous motor has a certain initial speed, which means that an induced potential may be induced on a stator. In a case that the permanent magnet synchronous motor is initiated directly without knowing a rotor position, a strong current and mechanical shock is caused unavoidably, and an overcurrent fault is caused in the converter, resulting in the converter becoming un-operable. It is of great significance to develop a technology for observing an initial position of the permanent magnet synchronous motor having the ability to operate at a speed.

To solve the problem described above, a way is to detect information on a rotor position by a position sensor installed at a bearing of the rotor of the motor. However, the position sensor will not only increase the volume and the cost of the motor, but also has a strict demand for usage environment, since external environmental factors such as vibration or humidity have a great effect on the position sensor. Another way is to install a voltage sensor at the stator for sampling the induced potential of the permanent magnet synchronous motor in a real-time manner before the converter starts to operate, so as to obtain the information on the rotor position. In this case, although the position sensor at the rotor is not required, the voltage sensor is required, which also increases the cost. In order to overcome the drawbacks caused by these sensors, another way to determine the rotor position is to use a control algorithm without a sensor as follows.

A voltage equation of the permanent magnet synchronous motor in a two-phase d-q rotating coordinate system is:

$$\begin{bmatrix} v_d \\ v_q \end{bmatrix} = \begin{bmatrix} R + pL_d & -\omega L_q \\ \omega L_d & R + pL_q \end{bmatrix} \begin{bmatrix} i_d \\ i_q \end{bmatrix} + \omega \varphi_f \begin{bmatrix} 0 \\ 1 \end{bmatrix} \quad (1)$$

where $\omega$ is an angular velocity of the rotor, R is a resistance of the stator, $\phi_f$ is a permanent magnet flux linkage, $i_d$ and $i_q$ are a d-axis current and a q-axis current respectively, $v_d$ and $v_q$ are a d-axis voltage and a q-axis voltage respectively, $L_d$ and $L_q$ are a d-axis inductance and a q-axis inductance respectively, and p is a differential operator.

All upper bridge arms (or lower bridge arms) of the inverter are switched on, so that the three-phase winding of the permanent magnet synchronous motor is short-circuited for a short time period. In this case, a voltage on the stator is equal to 0, that is, $v_d=0$ and $v_q=0$, thus the voltage equation is:

$$\begin{bmatrix} 0 \\ 0 \end{bmatrix} = \begin{bmatrix} pL_d & -\omega L_q \\ \omega L_d & pL_q \end{bmatrix} \begin{bmatrix} i_d \\ i_q \end{bmatrix} + \omega \psi_f \begin{bmatrix} 0 \\ 1 \end{bmatrix} \quad (2)$$

Assumed that $T_{sh}$ is a short-circuit time period, $\omega$ is a constant, the resistance of the stator is ignored, an initial current is 0, a short-circuit current vector on the stator is obtained by transforming the equation (1):

$$i_{(T_{sh})} = \begin{bmatrix} i_{d(T_{sh})} \\ i_{q(T_{sh})} \end{bmatrix} = \begin{bmatrix} -\dfrac{\psi_f}{L_d}(1 - \cos(\omega T_{sh})) \\ \dfrac{\psi_f}{L_q}\sin(\omega T_{sh}) \end{bmatrix} \quad (3)$$

The short-circuit current is transformed into a $\alpha$-$\beta$ static coordinate system, and a phase angle of the short-circuit current in the $\alpha$-$\beta$ static coordinate system is obtained:

$$\theta_{I\alpha\beta} = \arctan\left(\dfrac{i_\alpha}{i_\beta}\right) \quad (4)$$

An initial angular frequency $\omega_e$ of the stator is calculated according to a following equation:

$$\omega_e = \dfrac{\theta_{1iTsh} - \theta_{2iTsh}}{T_{sh} - \tau_{1-2}} \quad (5)$$

where $\theta_{1iTsh}$ and $\theta_{2iTsh}$ represent phase angles of a first short-circuit current vector and a second short-circuit current vector in the $\alpha$-$\beta$ static coordinate system respectively, and $\tau_{1-2}$ is a time interval between the first short circuit and the second short circuit.

An angle $\theta_{Idq}$ between $i_{Tsh}$ and the d-axis in the d-q coordinate system is calculated according to a following equation:

$$\theta_{Idq} \cong \arctan\left(\frac{i_q}{i_d}\right) = \arctan\left(\frac{-\frac{\varphi_f}{L_d}\sin(\omega_e T_{sh})}{-\frac{\varphi_f}{L_d}(1-\cos(\omega_e T_{sh}))}\right) = \arctan\left(\frac{L_d \sin(\omega_e T_{sh})}{L_q(1-\cos(\omega_e T_{sh}))}\right) \quad (6)$$

The information on the rotor position is:

$$\theta_e = \theta_{Idq} - \theta_{f\alpha\beta} \quad (7)$$

In the above method, the information on the rotor position is calculated by using a two short-circuiting method. However, the method relies on the inductance parameter and the rotor flux linkage parameter of the permanent magnet synchronous motor, and thus an error of the inductance parameter and the rotor flux linkage parameter will have a serious impact on the accuracy of the information on the rotor position.

SUMMARY

In view of above, an object of an embodiment of the present disclosure is to provide a method and a device for acquiring a rotor position based on a permanent magnet synchronous drive system, to accurately acquire information on the rotor position in a real-time manner without installing a sensor.

In order to achieve the object described above, the present disclosure provides a method for acquiring a rotor position based on a permanent magnet synchronous drive system. The permanent magnet synchronous drive system includes an inverter and a permanent magnet synchronous motor, the permanent magnet synchronous motor having an initial speed not being equal to zero. The method includes:

controlling a bridge arm switch of the inverter periodically, where during each control period, a current in each phase of stator winding of the permanent magnet synchronous motor is raised gradually from zero during a first time period, and is gradually attenuated to zero from an end value of the rising during a second time period, with a sum of the first time period and the second time period being equal to the whole control period;

collecting a three-phase current of the permanent magnet synchronous motor at a fixed time instant during each control period; and reversing the three-phase current and sending the reversed three-phase current to a phase-locked loop system for processing to obtain a phase angle of an induced potential vector, and acquiring a rotor position angle of the permanent magnet synchronous motor based on the phase angle of the induced potential vector, with the rotor position angle being an angle between an a-phase winding and a permanent magnet flux linkage.

Preferably, before the controlling the bridge arm switch of the inverter periodically, the method may further include determining the first time period and the second time period; and the determining the first time period and the second time period may include:
presetting the first time period;

calculating, according to a following equation, a longest time period t required to attenuate a maximum short-circuit current to zero:

$$t = -\frac{L}{R}\ln\left(\frac{\sqrt{3}\,\omega\psi_f - U_{dc}}{\sqrt{3}\,\omega\psi_f e^{-\frac{R}{L}\tau_1} - U_{dc}}\right)$$

where R is a phase resistance of the stator winding of the permanent magnet synchronous motor, L is a phase inductance of the stator winding of the permanent magnet synchronous motor, τ1 is the preset first time period, $\omega\psi_f$ is a peak value of an induced potential of the permanent magnet synchronous motor at a rated rotation speed, and $U_{dc}$ is a bus voltage at a direct-current side; and setting the second time period to be greater than or equal to the longest time period t.

Preferably, the controlling the bridge arm switch of the inverter periodically may include:

controlling all upper bridge arm switches of the inverter to be switched on and all lower bridge arm switches of the inverter to be switched off during the first time period, and controlling all switches of the inverter to be switched off during the second time period;

or controlling all lower bridge arm switches of the inverter to be switched on and all upper bridge arm switches of the inverter to be switched off during the first time period, and controlling all switches of the inverter to be switched off during the second time period.

Preferably, the fixed time instant may be a time instant when the first time period expires.

Preferably, the reversing the three-phase current and sending the reversed three-phase current to the phase-locked loop system for processing to obtain the phase angle of the induced potential vector may include:

reversing the three-phase current and sending the reversed three-phase current to the phase-locked loop system; and acquiring, by the phase-locked loop system, a rotor electrical angular velocity of the permanent magnet synchronous motor by using the reversed three-phase current, and acquiring the phase angle of the induced potential vector of the permanent magnet synchronous motor based on the rotor electrical angular velocity.

The embodiment of the present disclosure further provides a device for acquiring a rotor position based on a permanent magnet synchronous drive system. The permanent magnet synchronous drive system includes an inverter and a permanent magnet synchronous motor, the permanent magnet synchronous motor having an initial speed not being equal to zero. The device includes:

a switch control unit configured to control a bridge arm switch of the inverter periodically, where during each control period, a current in each phase of stator winding of a permanent magnet synchronous motor is raised gradually from zero during a first time period, and is gradually attenuated to zero from an end value of the rising during a second time period, with a sum of the first time period and the second time period being equal to the whole control period;

a current sampling unit configured to collect a three-phase current of the permanent magnet synchronous motor at a fixed time instant during each control period;

a potential phase angle acquiring unit configured to reverse the three-phase current and send the reversed three-phase current to a phase-locked loop system for processing to obtain a phase angle of an induced potential vector; and a rotor position acquiring unit configured to acquire a rotor position angle of the permanent magnet synchronous motor based on the phase angle of the induced potential vector, with the rotor position angle being an angle between an a-phase winding and a permanent magnet flux linkage.

Preferably, the device may further include:

a control time determining unit configured to determine the first time period and the second time period before the switch control unit controls the bridge arm switch of the inverter periodically;

where the control time determining unit may include:

a first time period setting subunit configured to preset the first time period;

an attenuation time duration calculating subunit configured to calculate, according to a following equation, a longest time period t required to attenuate a maximum short-circuit current to zero:

$$I = -\frac{L}{R} \ln\left( \frac{\sqrt{3}\,\omega\psi_f - U_{dc}}{\sqrt{3}\,\omega\psi_f e^{-\frac{R}{L}\tau_1} - U_{dc}} \right)$$

where R is a phase resistance of the stator winding of the permanent magnet synchronous motor, L is a phase inductance of the stator winding of the permanent magnet synchronous motor, $\tau 1$ is the preset first time period, $\omega\psi_f$ is a peak value of an induced potential of the permanent magnet synchronous motor at a rated rotation speed, and $U_{dc}$ is a bus voltage at a direct-current side; and a second time period setting subunit configured to set the second time period to be greater than or equal to the longest time period t.

Preferably, the switch control unit may include:

a first switch control subunit configured to control all upper bridge arm switches of the inverter to be switched on and all lower bridge arm switches of the inverter to be switched off during the first time period; and a second switch control subunit configured to control all switches of the inverter to be switched off during the second time period;

or the switch control unit may include:

a third switch control subunit configured to control all lower bridge arm switches of the inverter to be switched on and all upper bridge arm switches of the inverter to be switched off during the first time period; and a fourth switch control subunit configured to control all switches of the inverter to be switched off during the second time period.

Preferably, the fixed time instant may be a time instant when the first time period expires.

Preferably, the potential phase angle acquiring unit may include:

a current reversing subunit configured to reverse the three-phase current and send the reversed three-phase current to the phase-locked loop system; and a potential phase angle acquiring subunit configured to acquire, by the phase-locked loop system, a rotor electrical angular velocity of the permanent magnet synchronous motor by using the reversed three-phase current, and acquire the phase angle of the induced potential vector of the permanent magnet synchronous motor based on the rotor electrical angular velocity.

In the method and device for acquiring the rotor position based on the permanent magnet synchronous drive system according to the embodiment of the present disclosure, the bridge arm switch of the inverter is controlled periodically, so that a short-circuit current is generated in a three-phase winding of the permanent magnet synchronous motor during a short time period of each control period. Since orthogonal transformation is performed on the instantaneous induced potential, the orthogonal transformation is also performed on a magnitude of the short-circuit current. Therefore, the phase angle of the induced potential vector of the permanent magnet synchronous motor is obtained by detecting the phase angle of the short-circuit current, and the rotor position of the permanent magnet synchronous motor is determined accurately based on the phase angle of the induced potential vector in a real-time manner.

BRIEF DESCRIPTION OF THE DRAWINGS

In order to illustrate the technical solutions in the embodiments of the present disclosure or in the conventional technology more clearly, drawings required in the description of the embodiments or the conventional technology will be introduced simply in the following. Apparently, the drawings in the following description are only some embodiments of the disclosure. And based on the drawings, other drawings can also be obtained by those skilled in the art without any creative labor.

FIG. 1 is a schematic diagram of a permanent magnet synchronous drive system according to an embodiment of the present disclosure;

FIG. 2 is a schematic flow chart of a method for acquiring a rotor position based on a permanent magnet synchronous drive system according to an embodiment of the present disclosure;

DETAILED DESCRIPTION OF THE EMBODIMENTS

Figure 3:
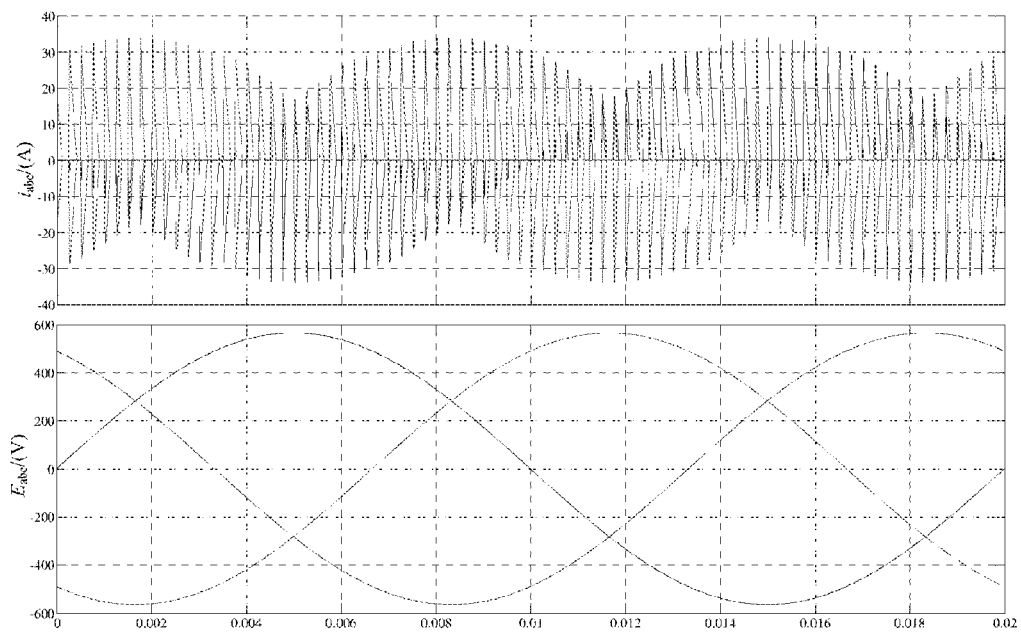
FIG. 3 is a schematic diagram of an induced potential response and a short-circuit current response.

In order to make the objects, technical solutions and advantages of the embodiments of the present disclosure clearer, the technical solutions according to the embodiments of the present disclosure will be described clearly and completely hereinafter in conjunction with drawings in the embodiments of the present disclosure. Apparently, the described embodiments are only some but not all of the embodiments of the present disclosure. Any other embodiments obtained by those skilled in the art based on the embodiments of the present disclosure without any creative labor will fall within the scope of protection of the present disclosure.

With reference to FIG. 1, which is a schematic diagram of a permanent magnet synchronous drive system according to an embodiment of the present disclosure, the permanent magnet synchronous drive system includes an inverter and a permanent magnet synchronous motor (abbreviated as PMSM). Specifically, the inverter may be a typical two-level three-phase PWM voltage-type inverter. In controlling according to the embodiment of the present disclosure, the permanent magnet synchronous motor has an initial speed ω. In a case that the permanent magnet synchronous drive system is initiated without knowing a rotor position of the motor, strong current and mechanical shock will be caused unavoidably, or an overcurrent fault will be caused in a converter, resulting in the converter becoming un-operable. Information on the rotor position can be acquired accurately in a real-time manner in the embodiment of the present disclosure. The embodiments of the disclosure will be described in detail below.

With reference to FIG. 2, which is a schematic flow chart of a method for acquiring a rotor position based on a permanent magnet synchronous drive system according to an embodiment of the present disclosure, the permanent magnet synchronous drive system includes an inverter and a permanent magnet synchronous motor, the permanent magnet synchronous motor having an initial speed not being equal to zero. The method includes following steps 201 to 203.

In step 201, a bridge arm switch of the inverter is controlled periodically, so that during each control period, a current in each phase of stator winding of the permanent magnet synchronous motor is raised gradually from zero during a first time period, and is gradually attenuated to zero from an end value of the rising during a second time period, with a sum of the first time period and the second time period being equal to the whole control period.

The bridge arm switch of the inverter may be controlled periodically in step 201 in one of the following ways.

In a first way, during the first time period, all upper bridge arm switches of the inverter are controlled to be switched on and all lower bridge arm switches of the inverter are controlled to be switched off; and during the second time period, all switches of the inverter are controlled to be switched off.

In a second way, during the first time period, all lower bridge arm switches of the inverter are controlled to be switched on and all upper bridge arm switches of the inverter are controlled to be switched off; and during the second time period, all switches of the inverter are controlled to be switched off.

In step 202, a three-phase current of the permanent magnet synchronous motor is collected at a fixed time instant during each control period.

Specifically, the fixed time instant may be a time instant when the first time period expires. A current in each phase of stator at this time instant is a maximum rising current value in the first time period.

In step 203, the three-phase current is reversed and the reversed three-phase current is sent to a phase-locked loop system for processing to obtain a phase angle of an induced potential vector, and a rotor position angle of the permanent magnet synchronous motor is acquired based on the phase angle of the induced potential vector, with the rotor position angle being an angle between an a-phase winding and a permanent magnet flux linkage.

In order to illustrate the embodiment of the present disclosure clearer, the embodiment of the present disclosure will be further introduced below in conjunction with the drawings.

With reference to FIG. 1, in controlling the bridge arm switch of the inverter, all upper bridge arm Insulated Gate Bipolar Transistors (IGBT) are switched on/off for a short time period periodically and all lower bridge arm IGBTs are switched off all the time. Alternatively, all lower bridge arm IGBTs are switched on/off for a short time period periodically and all upper bridge arm IGBTs are switched off all the time. Specifically, when all upper bridge arm IGBTs or all lower bridge arm IGBTs are switched on, a three phase winding of the permanent magnet synchronous motor is short-circuited, so that a short-circuit current flows through a current transformer (CT). If a tube voltage drop of the IGBT is ignored, an equation for a voltage of the motor is:

$$\begin{cases} E_a + i_a R + L\dfrac{di_a}{dt} = 0 \\ E_b + i_b R + L\dfrac{di_b}{dt} = 0 \\ E_c + i_c R + L\dfrac{di_c}{dt} = 0 \end{cases} \quad (8)$$

In equation (8), $E_a$, $E_b$ and $E_c$ are three phases of induced potentials of the permanent magnet synchronous motor respectively, with an amplitude thereof being $\omega\psi_f$, $\psi_f$ is a permanent magnet flux linkage, $I_a$, $I_b$ and $I_c$ are three phases of stator currents of the permanent magnet synchronous motor respectively, and R and L are phase resistance and phase induction of the winding of the permanent magnet synchronous motor respectively. If a voltage drop on the phase resistance is ignored, the above equation (8) may be rewritten as:

$$\begin{cases} E_a = -L\dfrac{di_a}{dt} \\ E_b = -L\dfrac{di_b}{dt} \\ E_c = -L\dfrac{di_c}{dt} \end{cases} \quad (9)$$

It can be seen from equation (9) that the induced potential of the permanent magnet synchronous motor may be estimated based on a short-time rising rate of the phase current.

Since each phase of induced potential is an alternating-current signal and is changed alternately during each control period, a highest rising point of the current is changed alternately with a phase of an induced potential vector. As show in FIG. 3, which is a schematic diagram of an induced potential response and a short-circuit current response, an amplitude value of the phase current is changed in a sine form, and a phase of the phase current is changed by 180 degrees relative to a phase of a corresponding phase voltage.

Discretization is performed on an induced potential voltage. It is assumed that a discrete time is Ts and Ts is short, and that the induced potential voltage is unchanged within Ts. That is, within Ts:

$$\begin{cases} E_a = -i_a R - L\dfrac{di_a}{dt} \\ E_b = -i_b R - L\dfrac{di_b}{dt} \\ E_c = -i_c R - L\dfrac{di_c}{dt} \end{cases} \tag{10}$$

Equation (10) is a typical first-order RL circuit. Within Ts, it is assumed that a switch-on time instant for all upper bridge arm IGBTs (or all lower bridge arm IGBTs) is a time instant t=0, and a current in the stator winding at this time instant is 0. In a case that a switch-on time period for all upper bridge arm IGBTs (or all lower bridge arm IGBTs) is $\tau_1$, then $$i_a(0) = 0, \; i_a(\tau 1) = -\dfrac{E_a}{R}\left(1 - e^{-\frac{R}{L}\tau 1}\right) \tag{11}$$

$$i_b(0) = 0, \; i_b(\tau 1) = -\dfrac{E_b}{R}\left(1 - e^{-\frac{R}{L}\tau 1}\right)$$

$$i_c(0) = 0, \; i_c(\tau 1) = -\dfrac{E_c}{R}\left(1 - e^{-\frac{R}{L}\tau 1}\right)$$

It can be seen from eqaution (11) that, the three phases of stator currents are raised gradually to $i_a(\tau 1)$, $i_b(\tau_1)$ and $i_c(\tau 1)$ from 0 respectively during the switch-on time period $\tau_1$.

In a case that the IGBTs are all switched off, a freewheeling operation is performed on the current in the stator winding via an IGBT backward diode, the three phases of stator currents are attenuated to zero from $i_a(\tau 1)$, $i_b(\tau 1)$ and $i_c(\tau 1)$ respectively during a certain time period every time when the IGBTs are all switched off.

It can be seen from above that, during each control period, each phase of stator current response is gradually raised from zero during a switch-on time period of all upper bridge arm IGBTs (or all lower bridge arm IGBTs), and is attenuated to zero from a maximum rising value during a switch-off time period of all IGBTs. Since the switch-on time period (short short-circuit time period) for the IGBT is fixed, a time duration of the control period relies on the switch-off time period of the IGBT. In order that the current in the stator winding is attenuated to zero from the maximum rising value during the switch-off time period of the IGBT, an operating condition under which an attenuation time period is the longest is determined from among different operating conditions of the permanent magnet synchronous drive system, a sum of the longest attenuation time period and the short-circuit time period is taken as a shortest duration of the control period, so that the stator current can be attenuated to zero during each control period. It can be seen from FIG. 3 that, an attenuation time period for a current in a A-phase winding is the longest in a case that $E_b$=0 or $E_c$=0, an attenuation time period for a current in a B-phase winding is the longest in a case that $E_a$=0 or $E_c$=0, and an attenuation time period for a current in a C-phase winding is the longest in a case that $E_a$=0 or $E_b$=0. The longest attenuation period t required to attenuate the current to zero may be calculated as follows based on one of the three cases described above.

Figure 4:
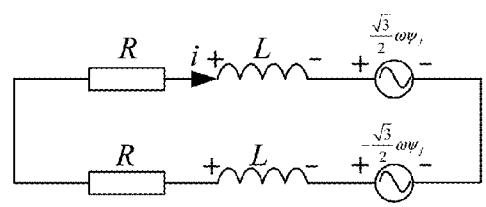
FIG. 4 is an equivalent short-circuit circuit diagram according to an embodiment of the present disclosure.

Specifically, taking $E_c$=0 as an example, with reference to an equivalent short-circuit circuit as shown in FIG. 4, assumed that $E_c$=0, then $$E_a = \dfrac{\sqrt{3}}{2}\omega\psi_f \text{ and } E_b = -\dfrac{\sqrt{3}}{2}\omega\psi_f,$$

and the maximum short-circuit current in the a-phase winding can be obtained based on a first-order zero response:

$$i_a = -\dfrac{\sqrt{3}\,\omega\psi_f}{2R}\left(1 - e^{-\frac{R}{L}\tau 1}\right) \tag{12}$$

Figure 5:
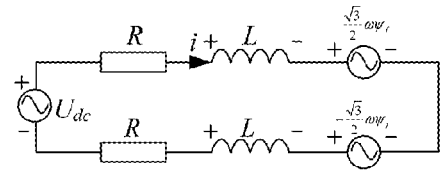
FIG. 5 is an equivalent freewheeling circuit diagram according to an embodiment of the present disclosure.

In a case that IGBTs are all switched off, a closed circuit is formed by a freewheeling diode and the current starts to be attenuated. With reference to an equivalent freewheeling circuit as shown in FIG. 5, a first-order homogeneous constant-coefficient differential equation is obtained according to the Kirchhoff's Voltage Law:

$$L\dfrac{di}{dt} + Ri = \dfrac{U_{dc} - \sqrt{3}\,\omega\psi_f}{2} \tag{13}$$

A general solution is obtained by solving equation (13):

$$i(t) = C_1 e^{-\frac{R}{L}t} + \dfrac{U_{dc} - \sqrt{3}\,\omega\psi_f}{2R} \tag{14}$$

It is obtained according to equation (12) that:

$$i(0) = -\dfrac{\sqrt{3}\,\omega\psi_f}{2R}\left(1 - e^{-\frac{R}{L}\tau 1}\right) \tag{15}$$

By bring equation (15) into equation (14), equation (16) is obtained:

$$-\dfrac{\sqrt{3}\,\omega\psi_f}{2R}\left(1 - e^{-\frac{R}{L}\tau 1}\right) = C_1 + \dfrac{U_{dc} - \sqrt{3}\,\omega\psi_f}{2R} \tag{16}$$

The constant $C_1$ is obtained by solving equation (16):

$$C_1 = -\dfrac{\sqrt{3}\,\omega\psi_f}{2R} + \dfrac{\sqrt{3}\,\omega\psi_f}{2R}e^{-\frac{R}{L}\tau 1} - \dfrac{U_{dc}}{2R} + \dfrac{\sqrt{3}\,\omega\psi_f}{2R} = \tag{17}$$

$$\dfrac{\sqrt{3}\,\omega\psi_f}{2R}e^{-\frac{R}{L}\tau 1} - \dfrac{U_{dc}}{2R}$$

Therefore, by bringing equation (17) into equation (14), equation (18) is obtained:

$$i(t) = \left(\frac{\sqrt{3}\,\omega\psi_f}{2R} e^{-\frac{R}{L}\tau_1} - \frac{U_{dc}}{2R}\right) e^{-\frac{R}{L}t} + \frac{U_{dc} - \sqrt{3}\,\omega\psi_f}{2R} \quad (18)$$

Assumed that i(t)=0 in equation (18), the longest time period t required to attenuate the current to zero is:

$$t = -\frac{L}{R}\ln\left(\frac{\sqrt{3}\,\omega\psi_f - U_{dc}}{\sqrt{3}\,\omega\psi_f e^{-\frac{R}{L}\tau_1} - U_{dc}}\right) \quad (19)$$

It can be seen from equation (19) that, if the phase resistance R, the phase inductance L and the rotor flux linkage $\psi_f$ remain unchanged, the greater a bus voltage $U_{dc}$ at the direct-current side is, the shorter the attenuation time period t is; the greater a rotation speed of the rotor is, the longer the attenuation time period t is; the longer the short short-circuit time period $\tau_1$ (the switch-on time period of the upper arm bridge or the lower arm bridge) is, the longer the attenuation time period t is.

Based on the above, the first time period and the second time period in step 201 may be determined offline before step 201 in a following way.

The first time period is preset, the longest time period t required to attenuate the maximum short-circuit current to zero is calculated according to equation (19):

$$t = -\frac{L}{R}\ln\left(\frac{\sqrt{3}\,\omega\psi_f - U_{dc}}{\sqrt{3}\,\omega\psi_f e^{-\frac{R}{L}\tau_1} - U_{dc}}\right)$$

where R is a phase resistance of the stator winding of the permanent magnet synchronous motor, L is a phase inductance of the stator winding of the permanent magnet synchronous motor, $\tau 1$ the preset first time period, $\omega\psi_f$ is a peak value of an induced potential of the permanent magnet synchronous motor at a rated rotation speed, and $U_{dc}$ is a bus voltage at a direct-current side.

It can be seen that a sum of the first time period $\tau 1$ and the longest attenuation time period t is a minimal value of the control period $T_c$. However, generally, the resistance R and the inductance L of the motor cannot be acquired accurately in a practical application, and the phase inductance L of the motor will be changed with the rotor position. Therefore, a margin may be left for the $T_c$, $$T_c \geq \tau 1 + t$$

Therefore, the second time period can be set to be greater than or equal to the longest time period t, to ensure that current in each phase of stator can be attenuated to zero from the maximum current rising value during the current control period.

It is to be understood that the durations of all control periods are the same, and the switch-on time periods of the upper arm IGBTs (or the lower arm IGBTs) during each control period are the same, current response on each phase of stator is gradually raised from zero and then gradually reducing to zero from an end value of the rising during each control period. Therefore, different current values can be obtained at different sampling points during the control period. However, a changing trend of the current is unchanged, as long as the current in each phase of stator is collected at fixed sampling points of different control periods (for example, the highest rising point of current in each phase is detected at each sampling, that is, the maximum short-circuit current in each phase of stator is detected).

In step 203, a phase angle of the induced potential vector of the permanent magnet synchronous motor may be acquired by using the following steps.

First, the three-phase current is reversed, and then the reversed three-phase current is sent to the phase-locked loop system.

Then, a rotor electrical angular velocity of the permanent magnet synchronous motor is acquired by the phase-locked loop system by using the reversed three-phase current, and the phase angle of the induced potential vector of the permanent magnet synchronous motor is acquired based on the rotor electrical angular velocity.

An operating principle of the phase-locked loop system mentioned in step 203 will be introduced below.

Figure 6:
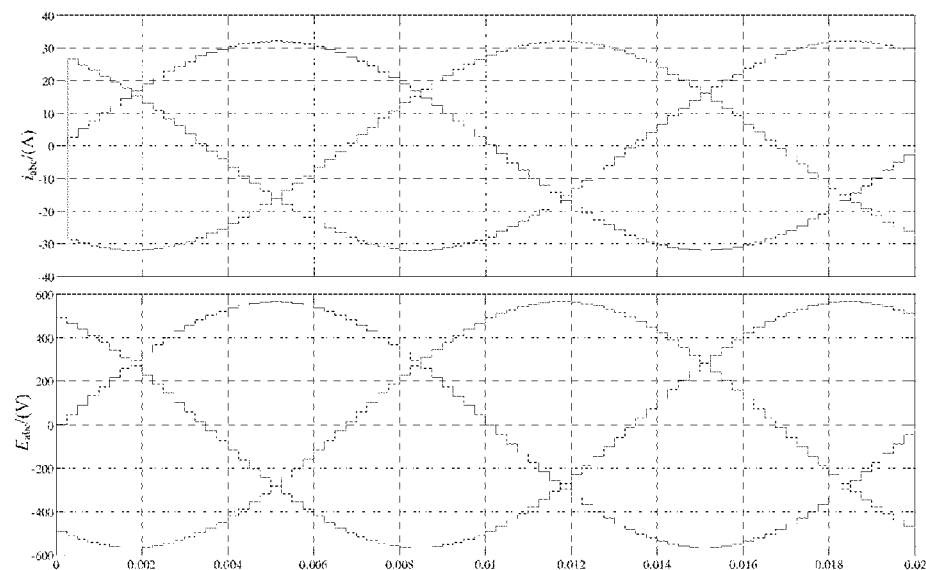
FIG. 6 is a schematic diagram of an reversed current curve and an induced potential curve.
Figure 7:
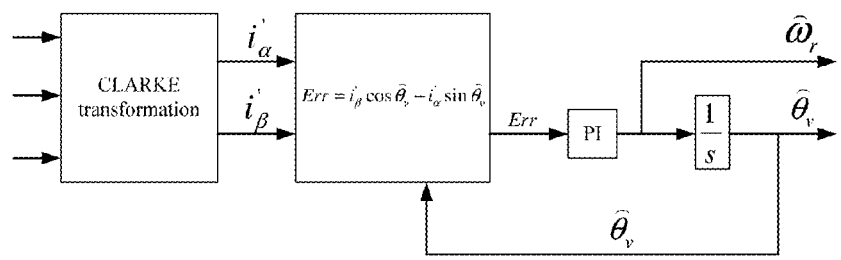
FIG. 7 is a schematic diagram of a phase-locked loop system according to an embodiment of the present disclosure.

With reference to FIG. 6, which is a schematic diagram of an inversed current curve and an induced potential curve, the current curve is a curve of a current which is discretely sampled and reversed, with a current sampling point being a maximum rising value for each phase of stator during the control period. It can be seen from FIG. 6 that, after the current is reversed, a phase of the current is consistent with a phase of the induced potential. Therefore, a real-time phase of the induced potential vector can be acquired by acquiring the phase of the reversed current in a real-time manner. The curve of the current which is discretely sampled and reversed is sent to the phase-locked loop system as shown in FIG. 7. An equation for the reversed current is:

$$\begin{cases} -i_a = I_m \cos(\omega_r t) \\ -i_b = I_m \cos\left(\omega_r t - \frac{2}{3}\pi\right) \\ -i_c = I_m \cos\left(\omega_r t + \frac{2}{3}\pi\right) \end{cases} \quad (20)$$

CLARKE transformation is performed on the reversed current, then $$\begin{cases} i'_\alpha = I_m \cos(\omega_r t) \\ i'_\beta = I_m \cos\left(\omega_r t - \frac{1}{2}\pi\right) \end{cases} \quad (21)$$

$$Err = i'_\beta \cos\hat{\theta}_v - i'_\alpha \sin\hat{\theta}_v \quad (22)$$

By bringing equation (21) into equation (22), equation (23) is obtained:

$$Err = I_m \cos\left(\omega_r t - \frac{1}{2}\pi\right)\cos(\hat{\omega}_r t) - I_m \cos(\omega_r t)\sin(\hat{\omega}_r t) \quad (23)$$

$$= I_m \sin(\omega_r t - \hat{\omega}_r t)$$

where $\omega_r t - \hat{\omega}_r t \approx \sin(\omega_r t - \hat{\omega}_r t)$, $\omega_r$ is an actual rotor electrical angle, and $\hat{\omega}_r$ is a rotor electrical angle after being adjusted by a PI controller.

It can be seen from above that, the phase of the reversed current is the same as the phase of the induced potential vector, the phase angle $\hat{\theta}_v = \hat{\omega}_r t$ of the induced potential vector may be obtained by integrating $\hat{\omega}_r$, that is, the phase angle is an angle formed by rotating in an anti-clockwise direction by taking a position of the a-phase winding as a starting point.

In step 203, after the phase angle $\hat{\theta}_v$ of the induced potential vector is obtained by the phase-locked loop system described above, an angle $\hat{\theta}_r$ of the rotor position of the permanent magnet synchronous motor is calculated according to a following equation:

$$\hat{\theta}_r = \hat{\theta}_v - \frac{\pi}{2} \qquad (24)$$

where the angle $\hat{\theta}_r$ of the rotor position is an angle between an a-phase winding and a permanent magnet flux linkage.

In the method for acquiring the rotor position based on the permanent magnet synchronous drive system according to the embodiment of the present disclosure, the bridge arm switch of the inverter is controlled periodically, so that a short-circuit current is generated in the three-phase winding of the permanent synchronous motor during a short time period of each control period. Since orthogonal transformation is performed on the instantaneous induced potential, the orthogonal transformation is performed on a magnitude of the short-circuit current. Therefore, the phase angle of the induced potential vector of the permanent magnet synchronous motor is obtained by detecting the phase angle of the short-circuit current, and then the rotor position of the permanent synchronous motor is determined accurately based on the phase angle of the induced potential vector in a real-time manner.

In order to illustrate the embodiment of the present disclosure more conveniently, the embodiment of the present disclosure is introduced by taking a permanent magnet synchronous motor having a power of 7 Kw and a rated power of 100 Hz as an example.

In step 1, a maximum short-circuit current is estimated.

Assumed that the short-circuit time period (that is, the first time period) is $\tau_1 = 0.00006$ s, a peak value of an induced potential of the motor at a rated rotation speed is $\omega_b \psi_f = 259$V, the phase resistance of the motor is $R = 0.78$ Ω, and the phase inductance of the motor is $L = 12$ mH. It can be seen from above that a maximum short-circuit current value is:

$$i(\tau_1) = \frac{E}{R}\left(1 - e^{-\frac{R}{L}\tau_1}\right) = \frac{259}{0.78}\left(1 - e^{-\frac{0.78 * 0.00006}{0.012}}\right) = 1.29 \text{ A}$$

It should be noted that the maximum short-circuit current should be less than a rated current, since a maximum attenuation time period will be too long if the maximum short-circuit current is too large, thereby increasing the time period of the control period, and affecting phase locking precision for the rotor position. Since the short-circuit time period is one of factors for determining the short-circuit current, the short-circuit time period should be decreased as much as possible, thereby decreasing the control period and improving the precision of the rotor position.

In step 2, the maximum attenuation time period is estimated.

Assumed that the bus voltage at the direct-current side is 563V and the peak value of the induced potential is $\omega_b \psi_f = 259$V, the maximum attenuation time period may be calculated according to equation (19) in a case that $\tau_1 = 0.00006$ s:

$$t_1 = -\frac{L}{R}\ln\left(\frac{\sqrt{3}\,\omega\psi_f - U_{dc}}{\sqrt{3}\,\omega\psi_f e^{-\frac{R}{L}\tau_1} - U_{dc}}\right) =$$

$$-\frac{0.012}{0.78}\ln\left(\frac{\sqrt{3}*259 - 563}{\sqrt{3}*259*e^{-\frac{0.78*0.00006}{0.012}} - 563}\right) = 0.000233 \text{ s}$$

In step 3, a control period and a duty cycle are set.

A minimal value of the control period $T_c$ may be obtained based on the short-circuit time period and the maximum attenuation time period. Since the resistance and the inductance of the motor cannot be acquired accurately in the practical application, a margin should be left for $T_c$, then $$T_c > \tau_1 + t_1 = 0.000233 + 0.00006 = 0.000293 \text{ s}$$

Assumed that the control period is $T_c = 0.0004$ s, a control frequency is $f_c = 2500$ Hz, and the duty cycle is $$\sigma = \frac{\tau_1}{T_c} = 15\%.$$

That is, during each control period, the first time period is 0.00006 s and the second time period is 0.00034 s.

In step 4, the bridge arm switch of the inverter is controlled periodically.

Figure 8:
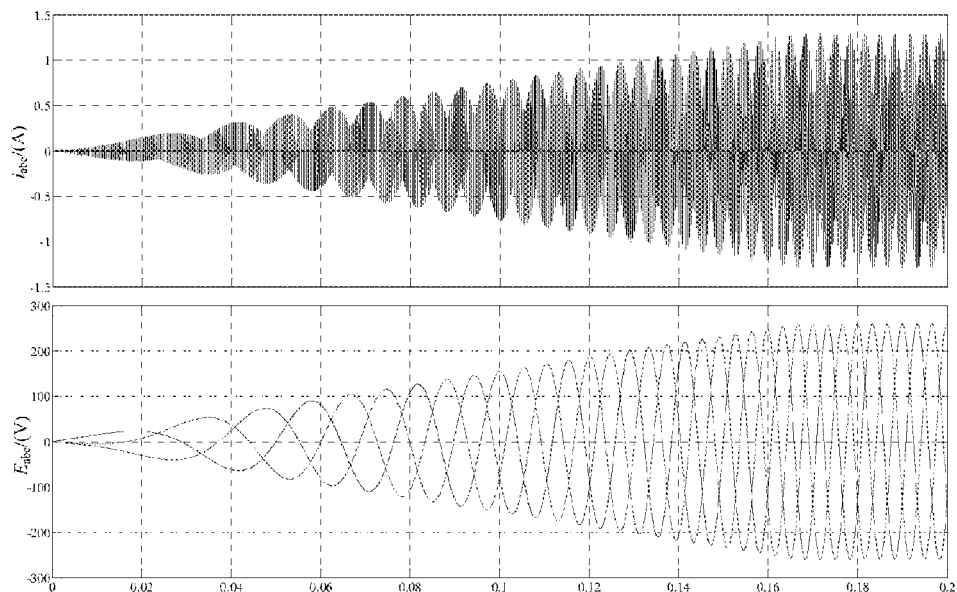
FIG. 8 is a schematic waveform diagram of a current response and an induced potential response in a process in which a rotation speed of the motor is changed gradually to a rated rotation speed from a zero rotation speed according to an embodiment of the present disclosure.

Reference is made to FIG. 8, which is a schematic waveform diagram of a current response and an induced potential response in a process in which the rotation speed of the motor is changed gradually to the rated rotation speed from a zero rotation speed according to the embodiment of the present disclosure.

In step 5, discrete sampling is performed on the current data.

Figure 9:
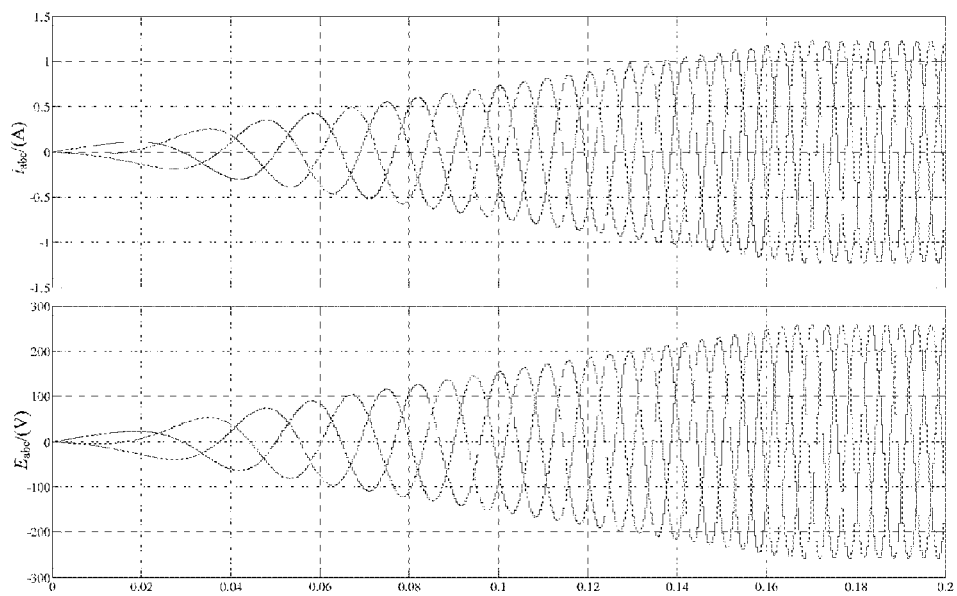
FIG. 9 is a schematic waveform diagram of a reversed current and an induced potential in a process in which a rotation speed of the motor is changed gradually to a rated rotation speed from a zero rotation speed after discrete sampling according to an embodiment of the present disclosure.

During each control period, AD sampling is initiated when all IGBTs are switched off, a current sampled at this time instant is a maximum current rising value during the control period, and three-phase sampled current is reversed, to obtain the schematic waveform diagram of the reversed current and the induced potential in a process during which a rotation speed of the motor is changed gradually to the rated rotational speed from zero after the discrete sampling as shown in FIG. 9.

In step 6, phase looping is performed on the current.

Figure 10:
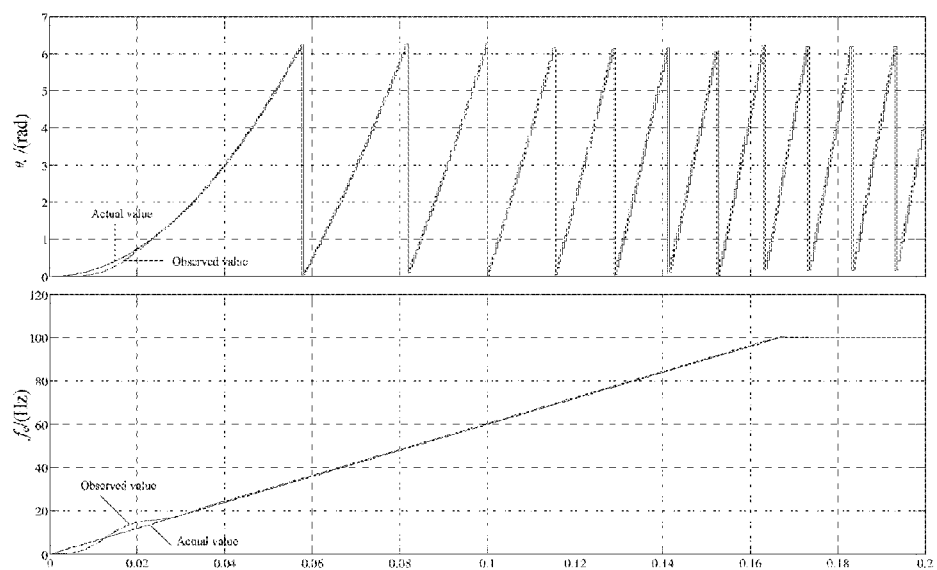
FIG. 10 is schematic variation diagram of a phase angle of an induced potential vector and an operating frequency according to an embodiment of the present disclosure.

The three-phase current as shown in FIG. 9 is sent to the phase-locked loop system as shown in FIG. 7, a real-time speed $\hat{\omega}_r$ of a rotor electrical angle (a real-time operating frequency $f_e$ of the motor is obtained based on $\hat{\omega}_r$) and a real-time phase angle $\hat{\theta}_v$ of the induced potential vector is obtained. Reference is made to FIG. 10, which is a schematic change diagram of the phase angle of the induced potential vector and the operating frequency. In FIG. 10, an actual value is data detected by a sensor, and an observed value is data obtained according to the embodiment of the present disclosure. It can be seen, by comparing the actual value with the observed value, that the data obtained by the embodiment of the present disclosure have a small error and therefore a high accuracy.

In step 7, information on the rotor position is acquired.

A real-time rotor position of the permanent magnet synchronous motor may be acquired by a following equation:

$$\hat{\theta}_r = \hat{\theta}_v - \frac{\pi}{2}$$

Figure 11:
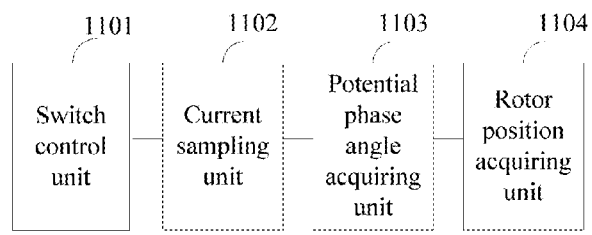
FIG. 11 is a schematic diagram of a device for acquiring a rotor position based on a permanent magnet synchronous drive system according to an embodiment of the present disclosure.

With reference to FIG. 11, which is a schematic diagram of a device for acquiring a rotor position based on a permanent magnet synchronous drive system according to an embodiment of the present disclosure, the permanent magnet synchronous drive system includes an inverter and a permanent magnet synchronous motor, the permanent magnet synchronous motor having an initial speed not being equal to zero. The device includes a switch control unit 1101, a current sampling unit 1102, a potential phase angle acquiring unit 1103 and a rotor position acquiring unit 1104.

The switch control unit 1101 is configured to control a bridge arm switch of the inverter periodically, so that during each control period, a current in each phase of stator winding of a permanent magnet synchronous motor is raised gradually from zero during a first time period, and is gradually attenuated to zero from an end value of the rising during a second time period, with a sum of the first time period and the second time period being equal to the whole control period.

The current sampling unit 1102 is configured to collect a three-phase current of the permanent magnet synchronous motor at a fixed time instant during each control period.

Specifically, the fixed time instant is a time instant when the first time period expires.

The potential phase angle acquiring unit 1103 is configured to reverse the three-phase current and send the reversed three-phase current to a phase-locked loop system for processing to obtain a phase angle of an induced potential vector.

The rotor position acquiring unit 1104 is configured to acquire a rotor position angle of the permanent magnet synchronous motor based on the phase angle of the induced potential vector, with the rotor position angle being an angle between an a-phase winding and a permanent magnet flux linkage.

Furthermore, the device further includes a control time determining unit.

The control time determining unit is configured to determine the first time period and the second time period before the switch control unit controls the bridge arm switch of the inverter periodically.

The control time determining unit includes a first time period setting subunit, an attenuation time duration calculating subunit and a second time period setting subunit.

The first time period setting subunit is configured to preset the first time period.

The attenuation time duration calculating subunit is configured to calculate, according to a following equation, a longest time period t required to attenuate a maximum short-circuit current to zero:

$$t = -\frac{L}{R}\ln\left(\frac{\sqrt{3}\,\omega\psi_f - U_{dc}}{\sqrt{3}\,\omega\psi_f e^{-\frac{R}{L}\tau_1} - U_{dc}}\right)$$

where R is a phase resistance of the stator winding of the permanent magnet synchronous motor, L is a phase inductance of the stator winding of the permanent magnet synchronous motor, $\tau_1$ is the preset first time period, $\omega\psi_f$ is a peak value of an induced potential of the permanent magnet synchronous motor at a rated rotation speed, and $U_{dc}$ is a bus voltage at a direct-current side.

The second time period setting subunit is configured to set the second time period to be greater than or equal to the longest time period t.

Specifically, the switch control unit 1101 includes a first switch control subunit and a second switch control subunit.

The first switch control subunit is configured to control all upper bridge arm switches of the inverter to be switched on and all lower bridge arm switches of the inverter to be switched off during the first time period.

The second switch control subunit is configured to control all switches of the inverter to be switched off during the second time period.

Alternatively, the switch control unit 1101 includes a third switch control subunit and a fourth switch control subunit.

The third switch control subunit is configured to control all lower bridge arm switches of the inverter to be switched on and all upper bridge arm switches of the inverter to be switched off during the first time period.

The fourth switch control subunit is configured to control all switches of the inverter to be switched off during the second time period.

Specifically, the potential phase angle acquiring unit 1103 includes a current reversing subunit and a potential phase angle acquiring subunit.

The current reversing subunit is configured to reverse the three-phase current and send the reversed three-phase current to a phase-locked loop system.

The potential phase angle acquiring subunit is configured to acquire, by the phase-locked loop system, a rotor electrical angular velocity of the permanent magnet synchronous motor by using the reversed three-phase current, and acquire a phase angle of the induced potential vector of the permanent magnet synchronous motor based on the rotor electrical angular velocity.

In the device for acquiring the rotor position based on the permanent magnet synchronous drive system according to the embodiment of the present disclosure, the bridge arm switch of the inverter is controlled periodically, so that a short-circuit current is generated in the three-phase winding of the permanent magnet synchronous motor during a short time period of each control period. Since orthogonal transformation is performed on the instantaneous induced potential, and the orthogonal transformation is performed on a magnitude of the short-circuit current. Therefore, the phase angle of the induced potential vector of the permanent magnet synchronous motor is obtained by detecting the phase angle of the short-circuit current, and then the rotor position of the permanent magnet synchronous motor is determined accurately based on the phase angle of the induced potential vector in a real-time manner.

It should be noted that, since the device disclosed in the embodiment corresponds to the method disclosed in the embodiment, the description for the device is simplified, and a part of the device may refer to the description for the relevant part of the method.

It also should be noted that, relation terms herein such as first and second are only used to distinguish an entity or operation from another entity or operation, and are not necessarily require or imply that there is any actual relation or sequence between the entities or operations. Furthermore, terms "include", "comprise" or any other variations are intended to cover non-exclusive "include", so that a process, a method, an object or a device including a series of factors not only include the factors, but further include other factors not explicitly listed, or further include inherent factors of the process, the method, the object or the device. Without more limitation, a factor defined in a sentence "include one . . ." does not exclude a case that there is also another same factor in the process, the method, the object or the device including the described factor.

According to the above description of the disclosed embodiments, the present disclosure can be implemented or practiced by those skilled in the art. Many changes to these embodiments are apparent to those skilled in the art, and general principles defined herein may be implemented in other embodiments without departing from the spirit or scope of the present disclosure. Hence, the present disclosure is not limited to the embodiments disclosed herein, but is to conform to the widest scope in accordance with the principles and novel features disclosed herein.

The invention claimed is:

1. A method for acquiring a rotor position based on a permanent magnet synchronous drive system, wherein the permanent magnet synchronous drive system comprises an inverter and a permanent magnet synchronous motor, the permanent magnet synchronous motor having an initial speed greater than zero, the method comprising:
controlling a bridge arm switch of the inverter periodically, wherein said controlling a bridge arm switch comprises, during each control period, performing one of the following:
controlling all upper bridge arm switches of the inverter to be switched on and all lower bridge arm switches of the inverter to be switched off during a first time period, and controlling all switches of the inverter to be switched off during a second time period; and controlling all lower bridge arm switches of the inverter to be switched on and all upper bridge arm switches of the inverter to be switched off during a first time period, and controlling all switches of the inverter to be switched off during a second time period;
wherein a sum of the first time period and the second time period is equal to the control period;
collecting a three-phase current of the permanent magnet synchronous motor at a fixed time instant during each control period;
reversing the three-phase current and sending the reversed three-phase current to a phase-locked loop system;
obtaining a phase angle of an induced potential vector; and
acquiring a rotor position angle of the permanent magnet synchronous motor based on the phase angle of the induced potential vector, wherein the rotor position angle is an angle between an a-phase winding and a permanent magnet flux linkage.

2. The method according to claim 1, wherein before the controlling the bridge arm switch of the inverter periodically, the method further comprises determining the first time period and the second time period; and
the determining the first time period and the second time period comprises:
presetting the first time period;
calculating, according to a following equation, a longest time period t required to attenuate a maximum short-circuit current to zero:

$$t = -\frac{L}{R}\ln\left(\frac{\sqrt{3}\,\omega\psi_f - U_{dc}}{\sqrt{3}\,\omega\psi_f e^{-\frac{R}{L}\tau_1} - U_{dc}}\right)$$

where R is a phase resistance of the stator winding of the permanent magnet synchronous motor, L is a phase inductance of the stator winding of the permanent magnet synchronous motor, τ1 is the preset first time period, $\omega\psi_f$ is a peak value of an induced potential of the permanent magnet synchronous motor at a rated rotation speed, and $U_{dc}$ is a bus voltage at a direct-current side; and
setting the second time period to be greater than or equal to the longest time period t.

3. The method according to claim 1, wherein the fixed time instant is a time instant when the first time period expires.

4. The method according to claim 1, wherein the reserving the three-phase current and sending the reversed three-phase current to the phase-locked loop system for processing to obtain the phase angle of the induced potential vector comprises:
reversing the three-phase current and sending the reversed three-phase current to the phase-locked loop system; and
acquiring, by the phase-locked loop system, a rotor electrical angular velocity of the permanent magnet synchronous motor by using the reversed three-phase current, and acquiring the phase angle of the induced potential vector of the permanent magnet synchronous motor based on the rotor electrical angular velocity.

5. A device for acquiring a rotor position based on a permanent magnet synchronous drive system, wherein the permanent magnet synchronous drive system comprises an inverter and a permanent magnet synchronous motor, the permanent magnet synchronous motor having an initial speed greater than zero, the device comprising:
a switch control unit configured to control a bridge arm switch of the inverter periodically during each control period, the switch control unit comprising one of the following:
(1) a first switch control subunit and a second switch control subunit; and
(2) a third switch control subunit and a fourth switch control subunit;
wherein the first switch control subunit is configured to control all upper bridge arm switches of the inverter to be switched on and all lower bridge arm switches of the inverter to be switched off during a first time period;
the second switch control subunit is configured to control all switches of the inverter to be switched off during a second time period;
the third switch control subunit is configured to control all lower bridge arm switches of the inverter to be switched on and all upper bridge arm switches of the inverter to be switched off during a first time period;
the fourth switch control subunit is configured to control all switches of the inverter to be switch off during a second time period;
wherein a sum of the first time period and the second time period is equal to the control period;
a current sampling unit configured to collect a three-phase current of the permanent magnet synchronous motor at a fixed time instant during each control period;

a potential phase angle acquiring unit configured to reverse the three-phase current and send the reversed three-phase current to a phase-locked loop system for processing to obtain a phase angle of an induced potential vector; and a rotor position acquiring unit configured to acquire a rotor position angle of the permanent magnet synchronous motor based on the phase angle of the induced potential vector, with the rotor position angle being an angle between an a-phase winding and a permanent magnet flux linkage.

6. The device according to claim 5, further comprising:

a control time determining unit configured to determine the first time period and the second time period before the switch control unit controls the bridge arm switch of the inverter periodically;

wherein the control time determining unit comprises:

a first time period setting subunit configured to preset the first time period;

an attenuation time duration calculating subunit configured to calculate, according to a following equation, a longest time period t required to attenuate a maximum short-circuit current to zero:

$$t = -\frac{L}{R}\ln\left(\frac{\sqrt{3}\,\omega\psi_f - U_{dc}}{\sqrt{3}\,\omega\psi_f e^{-\frac{R}{L}\tau_1} - U_{dc}}\right)$$

where R is a phase resistance of the stator winding of the permanent magnet synchronous motor, L is a phase inductance of the stator winding of the permanent magnet synchronous motor, τ1 is the preset first time period, $\omega\psi_f$ is a peak value of an induced potential of the permanent magnet synchronous motor at a rated rotation speed, and $U_{dc}$ is a bus voltage at a direct-current side; and a second time period setting subunit configured to set the second time period to be greater than or equal to the longest time period t.

7. The device according to claim 5, wherein the switch control unit comprises:

a first switch control subunit configured to control all upper bridge arm switches of the inverter to be switched on and all lower bridge arm switches of the inverter to be switched off during the first time period; and a second switch control subunit configured to control all switches of the inverter to be switched off during the second time period;

or the switch control unit comprises:

a third switch control subunit configured to control all lower bridge arm switches of the inverter to be switched on and all upper bridge arm switches of the inverter to be switched off during the first time period; and a fourth switch control subunit configured to control all switches of the inverter to be switched off during the second time period.

8. The device according to claim 5, wherein the fixed time instant is a time instant when the first time period expires.

9. The device according to claim 5, wherein the potential phase angle acquiring unit comprises:

a current reversing subunit configured to reverse the three-phase current and send the reversed three-phase current to the phase-locked loop system; and a potential phase angle acquiring subunit configured to acquire, by the phase-locked loop system, a rotor electrical angular velocity of the permanent magnet synchronous motor by using the reversed three-phase current, and acquire the phase angle of the induced potential vector of the permanent magnet synchronous motor based on the rotor electrical angular velocity.

* * * * *